(12) United States Patent
Compaan

(10) Patent No.: US 7,407,217 B2
(45) Date of Patent: Aug. 5, 2008

(54) COMPOSITION SIDEBOARD FOR DUMP TRUCKS

(76) Inventor: Paul Compaan, P.O. Box 1664, Ellensburg, WA (US) 98926

(\*) Notice: Subject to any disclaimer, the term of this patent is extended or adjusted under 35 U.S.C. 154(b) by 97 days.

(21) Appl. No.: 11/553,741

(22) Filed: Oct. 27, 2006

(65) Prior Publication Data

US 2008/0100078 A1 May 1, 2008

(51) Int. Cl.
*B60P 7/00* (2006.01)
(52) U.S. Cl. .................. 296/183.2; 296/183.1; 296/21; 40/591
(58) Field of Classification Search ............. 296/183.1, 296/183.2, 32, 21; 40/591
See application file for complete search history.

(56) References Cited

U.S. PATENT DOCUMENTS 4,050,734 A \* 9/1977 Richard .................. 296/98
4,474,404 A \* 10/1984 Hagenbuch ............. 296/182.1

\* cited by examiner

*Primary Examiner*—Joseph D Pape
(74) *Attorney, Agent, or Firm*—Clark A. Puntigam; Jensen & Puntigam, P.S.

(57) ABSTRACT

The sideboard member includes an interior core portion (32) which is made from a composite material of shredded rubber and polyurethane plastic, and other ingredients. The core portion is covered with a durable rubber layer (35) which is bonded to the core portion and has a thickness of ⅛-inch to ⅜-inch. The top surface (38) of the sideboard member is in the form of an inverted "V", with each side extending inwardly toward each other at an angle of approximately 45°, the top edge (44) of the inverted V being rounded.

7 Claims, 4 Drawing Sheets

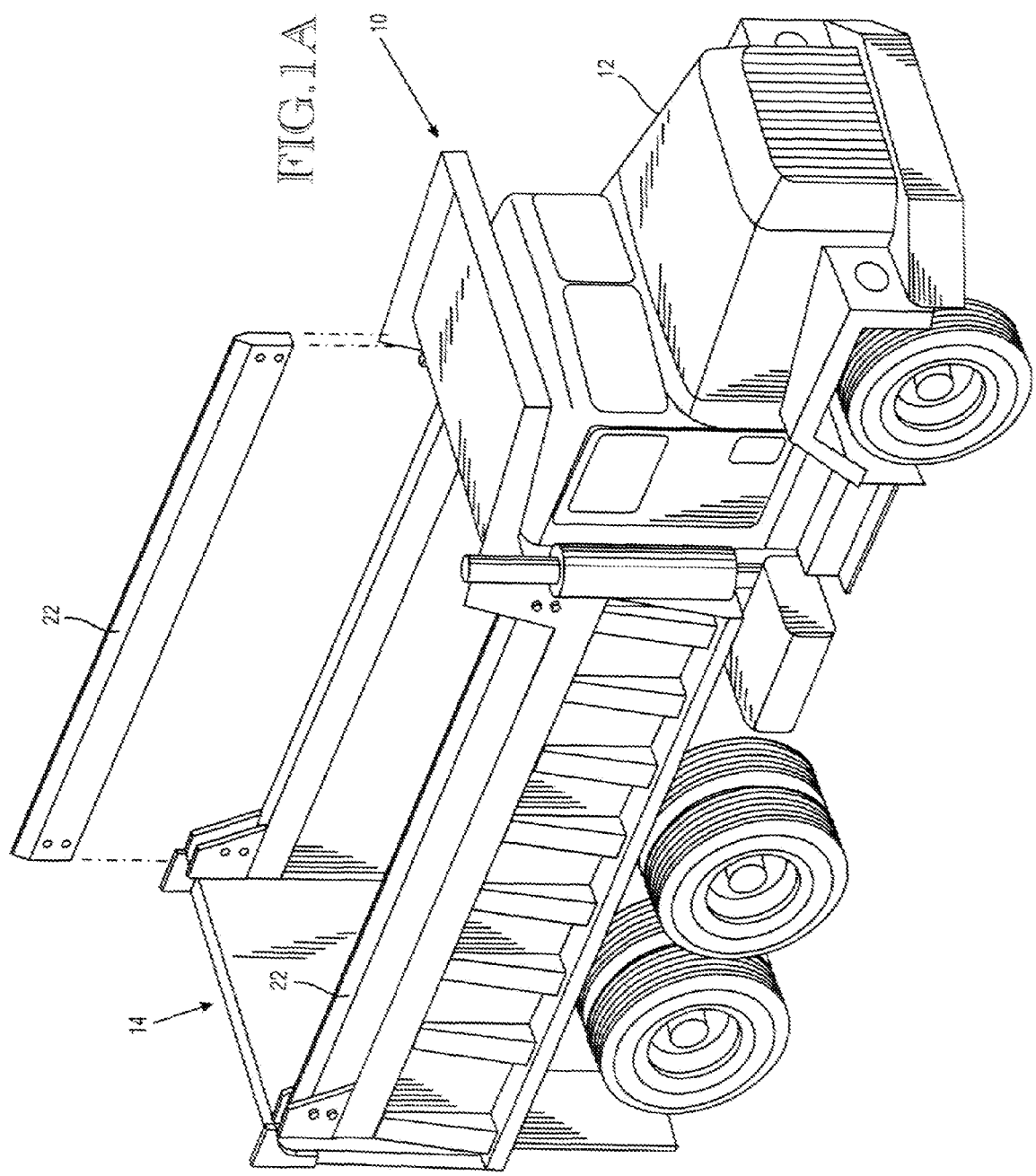

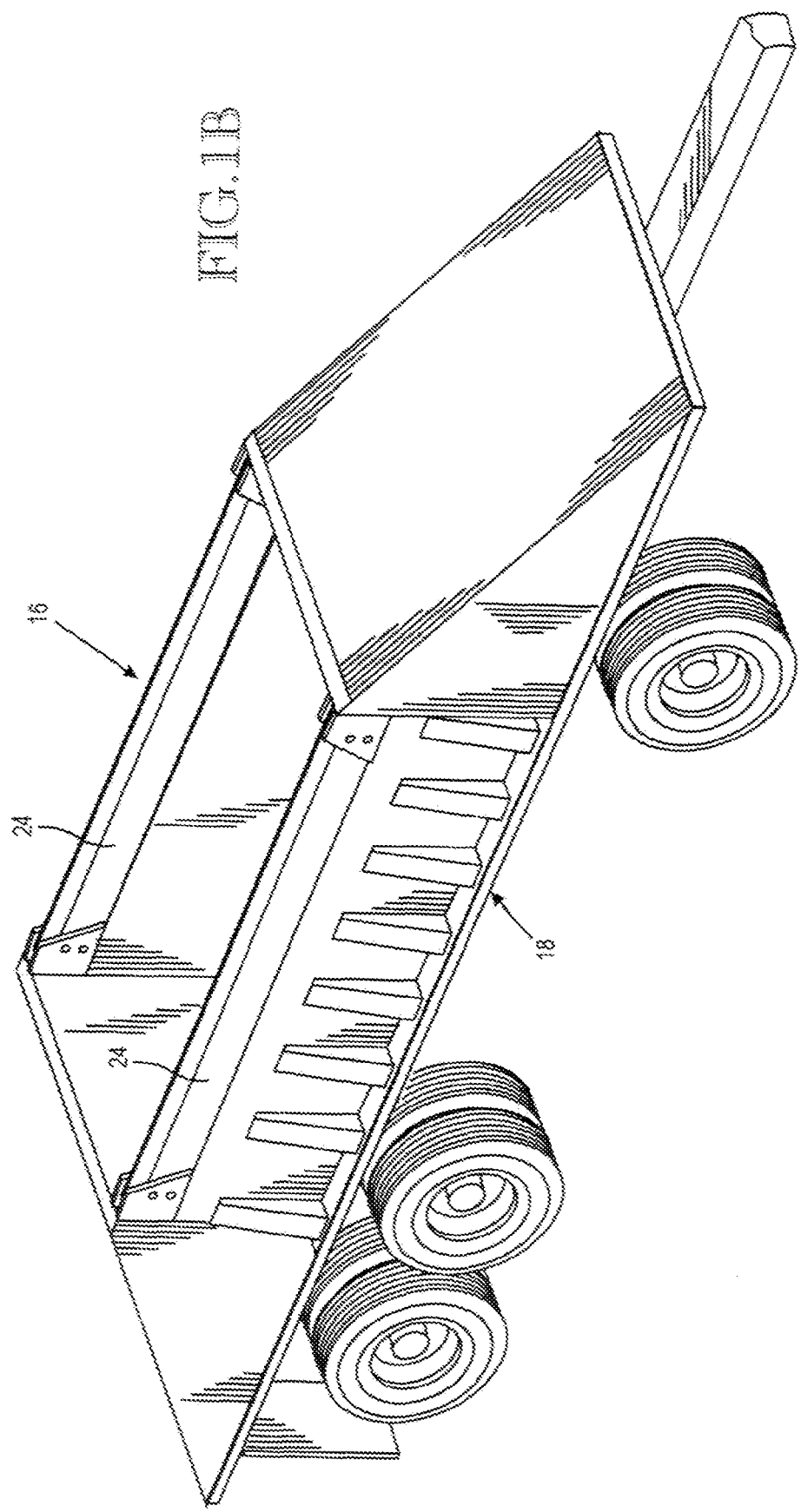

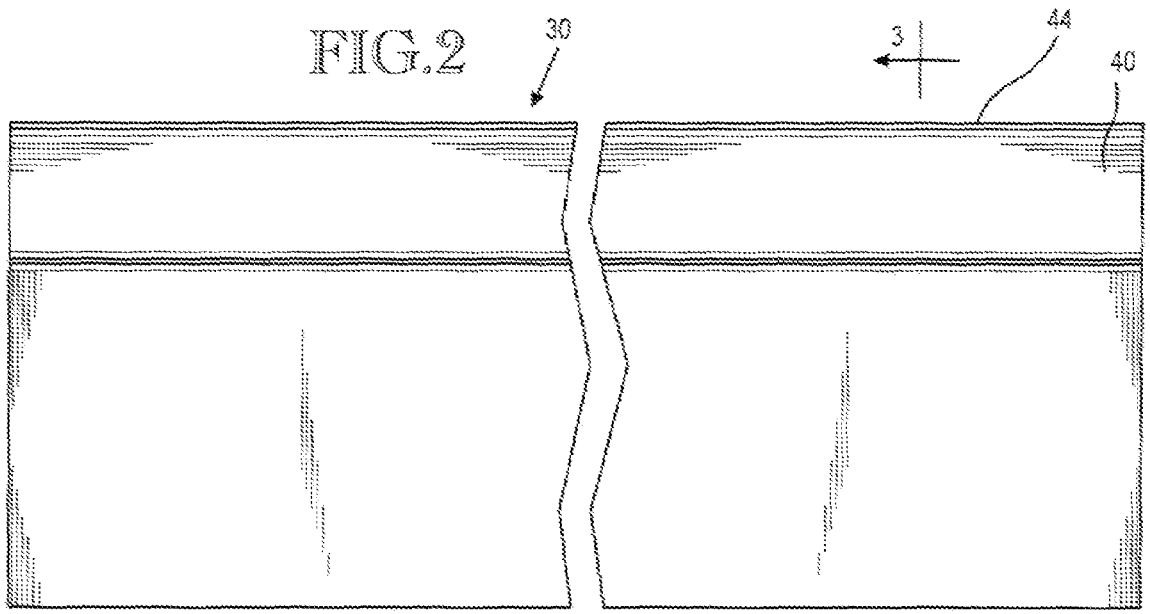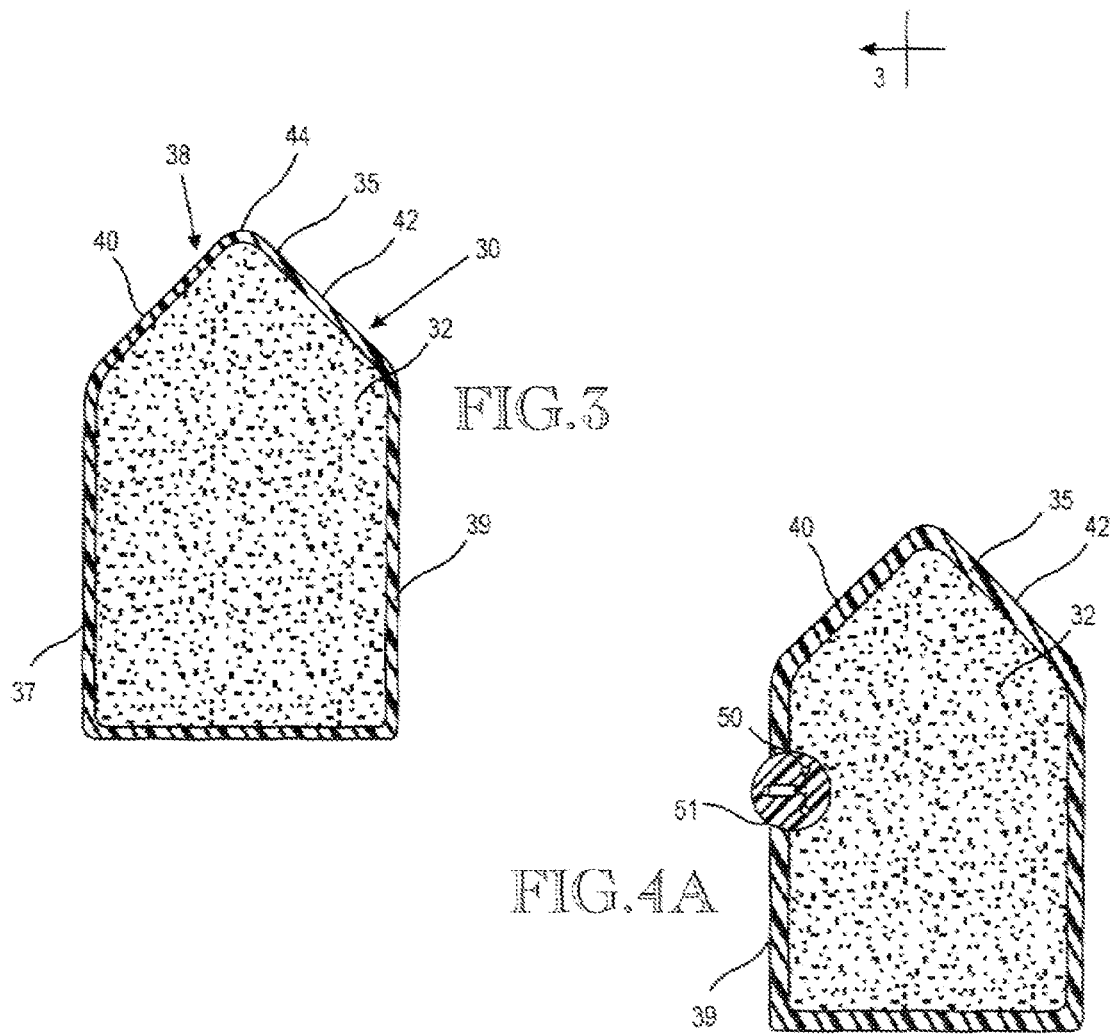

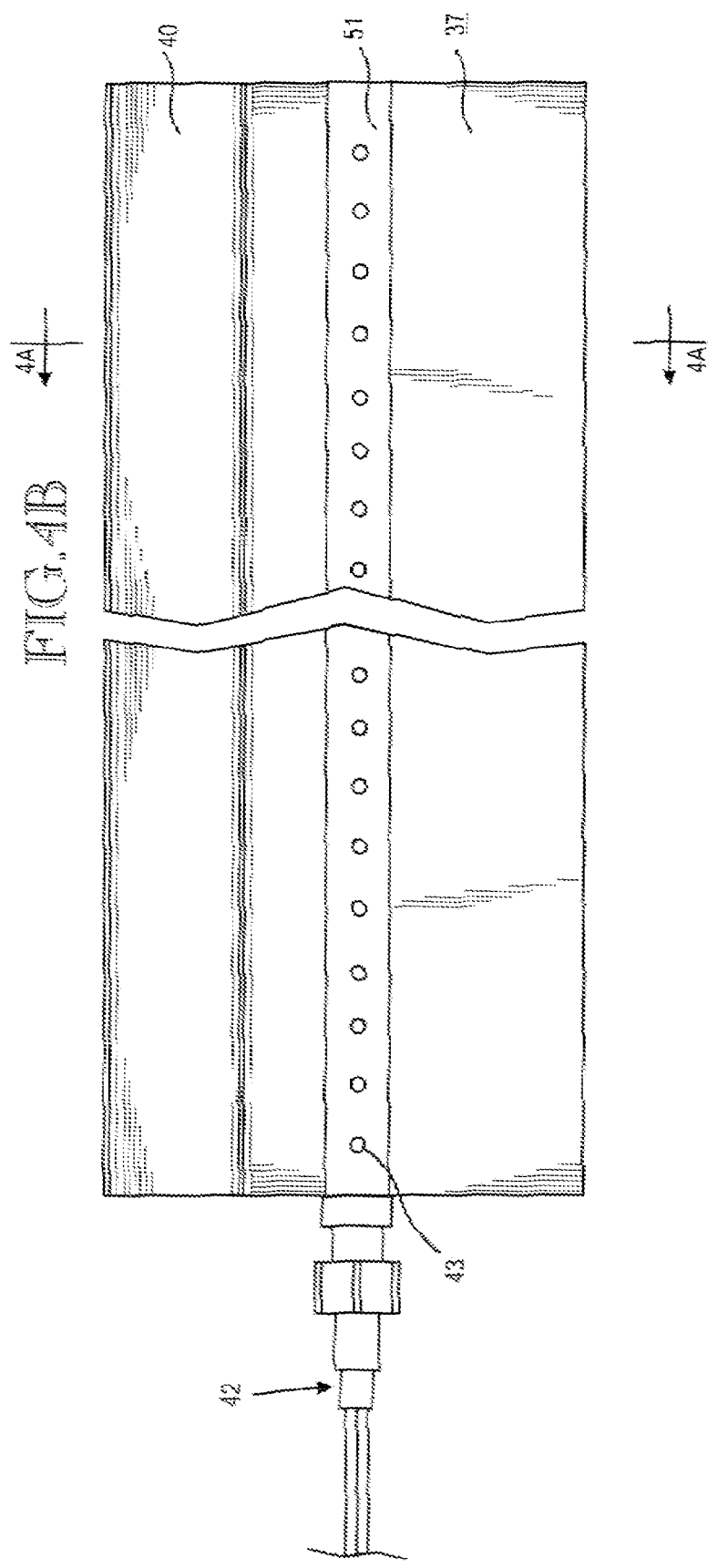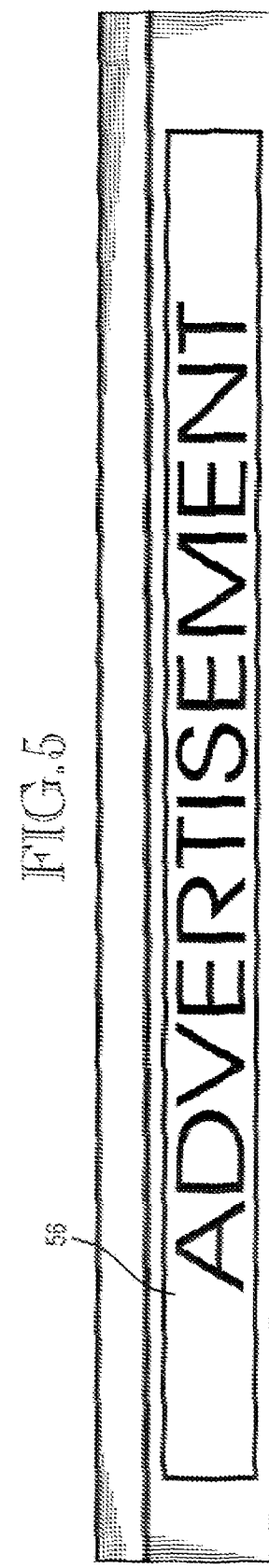

COMPOSITION SIDEBOARD FOR DUMP TRUCKS

TECHNICAL FIELD

This invention relates generally to dump trucks and cab/trailer and dump combinations and more specifically, to sideboard members used on the top sides of dump trucks and trailers.

BACKGROUND OF THE INVENTION

Dump trucks (with or without an additional trailer) and separate trailers (with cabs) have historically used wood boards positioned along the tops of the sides of the metal dump truck boxes or the sides and ends of trailers to absorb contact with loading buckets or other apparatus which in operation swing or load over the top sides to dump their contents into the dump truck/trailer and then are moved out again to retrieve another load of material. The side boards prevent damage to the structure of the dump truck/trailer itself during loading operations as well as increasing the load capacity of the vehicle.

Contact often occurs between the loading apparatus and the sideboards because the top edge of the sideboard is misjudged by the operator. Conventional sideboards, due to the physical contact by the various loading equipment, typically have a short life span. Although they are expensive to replace, they are less expensive than regularly repairing the sides of dump trucks/trailers. Further, conventional sideboards typically have a flat top surface which accumulates dust and other loading debris, which must be cleaned off prior to entering public roads, which is an inconvenience to the operators of such vehicles, as well as producing a loss of time and hence, revenue.

Accordingly, it would be desirable to have a sideboard structure which accomplishes the function of conventional dump truck/trailer sideboards, while being significantly more durable and more attractive, as well as less expensive over time to use.

SUMMARY OF THE INVENTION

Accordingly, the present invention is a sideboard member for dump trucks and trailers, comprising an extruded sideboard member made from a composite material comprising more than 50% of shredded rubber and most of the remainder a polyurethane plastic, such that the composite material is hard and durable, wherein a top surface of the sideboard member is in the form of an inverted "V".

BRIEF DESCRIPTION OF THE DRAWINGS

FIG. 1A shows a conventional dump truck with the sideboards of the present invention in place on the dump box, while FIG. 1B shows sideboards used in a conventional dump trailer (belly/side dump), or end dump.

FIG. 2 shows a side elevational view of one embodiment of the sideboard described herein.

FIG. 3 is an end elevational view of the sideboard of FIG. 2.

FIGS. 4A and 4B are side elevational and cross-sectional views of a modification of the sideboard of FIGS. 1-3, which includes a visible light structure which extends the length of the sideboard.

FIG. 5 is a side elevational view of a sideboard with an advertising billboard element secured to the side surface thereof.

BEST MODE FOR CARRYING OUT THE INVENTION

FIG. 1A shows a conventional dump truck using the sideboards described herein, while FIG. 1B shows a conventional belly/side dump trailer, also using the present sideboards. It should be understood that the trailer of FIG. 1B, which shows one forward axle and two rear axles, could have various axle combinations, including additional front and/or rear axles. For instance, trailers come with 2, 3, 4 and 5 axles, in various combinations. FIG. 1B is representative of all such axle combinations.

The dump truck, shown generally at 10, is conventional, including a cab 12 and a dump box 14 which can be lifted by well-known mechanical means to dump the contents thereof out the rear end of the dump box 14. The dump truck structure of FIG. 1A may also include a separate trailer connected to the rear end of the dump truck.

The dump trailer 16 of FIG. 1B is hauled by a conventional trailer cab 12, i.e. a truck-trailer combination with one or more trailers, but is constructed so that its contents are released through a bottom portion 18 (belly dump), or by rotating the trailer to one side or the other to dump its contents from the side (side dump). The dump box 14 of FIG. 1A includes sideboards 22-22 which extend along the sides of and at the top on the dump box, as well as on trailers connected to the dump truck, while dump trailer 16 of FIG. 1B also includes sideboards 24-24 along both sides, and in some cases the ends of the top opening of the trailer, depending upon the configuration of the trailer. The sideboards typically fit snugly into slots in the top edges of the dump box and the dump trailer or are held there by some other means, such as clips or brackets.

As indicated above, the sideboards are for the practical purpose of protecting the structure of the dump box or the trailer or for increasing the load size/capacity of the vehicle as they are being loaded or unloaded by conventional loading equipment. When the fully loaded bucket/device swings (dumps) over the tope edge of the sideboard in operation to dump its contents into the dump box or trailer, and when the emptied bucket swings/is pulled back out over the sideboard to refill, contact will occasionally occur at some point in time, between the bucket and the sideboards. Thus, while preserving the dump box/trailer structure, damage does occur to the sideboards.

The sideboards shown and described herein, which unlike conventional wood boards are very durable and resist damage, will vary in size, with a thickness approximately in the range of 1-5 inches, and a height from as short as 4 inches to as much as 24 inches, depending upon the particular application. Further, the sideboards will extend for the full length, where appropriate, of the dump box, although the sideboard can comprise a number of separate sections arranged continuously end to end.

Such a sideboard is shown in more detail in FIGS. 2 and 3. A sideboard 30 has an interior core 32 which is a composition which in general is a combination of shredded recycled tires (rubber) and a polyurethane plastic, as well as additional ingredients, including reinforcing material and other additions. One product which would be suitable is available from Rumber Materials, Inc. Further, information relative to a suitable product is provided in U.S. Pat. No. 5,861,117. Generally, it is approximately 75% rubber, 20% polyurethane and thermoplastic and 5% other materials. Other compositions, however, can combine the durability and strength of the above composition, which has the advantage of being very hard and durable and capable of absorbing contact by loading buckets without significant damage.

The interior core portion 32 in the embodiment shown is covered by a hard polymer (polyurethane) layer 34 similar to that used for lining of pick-up truck beds, which is available commercially from a large number of manufacturers. This layer 35 is applied onto the core 32 on every surface. It typically will vary from ⅛-inch thick to ⅜-thick. One advantage to such a material is that it can readily receive a dye, to provide a durable color for the sideboards. The color will extend completely through layer 35, and hence cannot be scraped or wear off. Color is thus well preserved during the lifetime of the sideboard.

The top surface 38 of the sideboard 30, instead of being flat, is angled upwardly and inwardly from both side surfaces 37 and 39, forming an inverted "V", to a top edge 44, which is rounded. In the embodiment shown, the angle of angled portions 40 and 42 is approximately 45°. This angle can be varied, ±25°, and still provide the same advantages. The inverted V-shaped top allows dirt and other material to run off the angled surfaces and not accumulate thereon, thereby saving the operator the necessity of periodically cleaning off the top edge preventing the problems associated with debris on the sideboards.

In an embodiment shown in FIGS. 4A and 4B, an LED light string 43 extends along the length of the sideboard, captured in a partially circular groove 50 in the outer side surface 37 of each sideboard. In the embodiment shown, the groove 50 is partially circular in diameter, with a diameter of 9/16 inch, with an opening 51 to surface 37 having a width of approximately ½ inch. This arrangement permits a standard commercially available LED rope light, which is a series of LEDs in a flexible plastic transparent tube, to be placed in and captured by groove 50. The light string 43 provides light through opening 51 along the length of the sideboard.

At one end of light string 43, extending from the sideboard, is an electrical connection 42 for connection to a source of power on the dump truck/trailer. Typically, the groove 50 will be located near the top of the side surface of the sideboard, but its exact position can vary. When lit, the light string 43 will add to the appearance of the sideboard and also provide additional illumination on the truck for increased visibility for the loading equipment operator in low or no light conditions, such as at dusk or at night.

In addition, some sideboards will have a billboard structure 56, attached by adhesive to the outer side surface 40 of the sideboard, as shown in FIG. 5. The billboard 56 can incorporate various advertising, thereby providing additional revenue for the truck owner/operator. The billboard 56 can be secured so that it is replaceable with other billboards, or it can be constructed so as to accommodate different advertising placards with a securing device, such as hooks or slots from which an advertising placard can be inserted and/or removed. Vacuum forms or glue can also be used. The billboard can be used with a sideboard having a light string, or not, depending on the height of the sideboard.

Hence, a new sideboard construction for dump trucks or trailers has been disclosed which is rugged and durable, thereby saving substantially on the cost and inconvenience of repeated replacements of conventional wood sideboards.

Although a preferred embodiment of the invention has been disclosed for purposes of illustration, it should be understood that various changes, modifications and substitutions may be incorporated in such embodiment without departing from the spirit of the invention, which is defined by the claims which follow.

What is claimed is:

1. A sideboard member for dump trucks and trailers, comprising:
   an extruded sideboard member made from a composite material comprising more than 50% of shredded rubber and most of the remainder a polyurethane plastic, such that the composite material is hard and durable, wherein a top surface of the sideboard member is in the form of an inverted "V".

2. The sideboard of claim 1, wherein each side extends toward each other to form the inverted V at an angle of 45°±25°.

3. The sideboard member of claim 1, wherein the inverted V has a rounded top edge.

4. The sideboard member of claim 1, wherein the composite member is covered with a durable plastic material layer which is bondable to the composite material and which is at least ⅛-inch thick.

5. The sideboard member of claim 4, wherein the plastic material layer is colored throughout the layer.

6. The sideboard member of claim 1, wherein the sideboard includes a longitudinal groove in one side surface thereof, the groove being partially open, and a light member which is positioned within and extends along the length of the groove, wherein the light member illuminates in response to an electrical current being applied thereto, wherein the opening of the groove is configured such as to not permit the light member to be removed from the sideboard therethrough.

7. The sideboard member of claim 1, including a billboard member for advertising, which is attachable to a side surface of the sideboard member.

\* \* \* \* \*